United States Patent [19]
Campbell

[11] Patent Number: 5,957,528
[45] Date of Patent: Sep. 28, 1999

[54] SEAT COVER

[76] Inventor: Kelly K. Campbell, 8038 Main, Kansas City, Mo. 64114

[21] Appl. No.: 08/998,308

[22] Filed: Dec. 24, 1997

[51] Int. Cl.$^6$ .................................................. A47C 31/00
[52] U.S. Cl. .................................. 297/228.12; 297/228.1; 297/228.11; 297/229; 297/230.1; 297/219.1; 297/226; 297/218.4
[58] Field of Search ........................... 297/228.12, 228.1, 297/228.11, 229, 219.1, 224, 225, 230.1, 226, 218.4

[56] References Cited

U.S. PATENT DOCUMENTS

| | | | |
|---|---|---|---|
| 1,748,743 | 2/1930 | Wedler | 297/224 |
| 2,027,947 | 1/1936 | Wittcoff | 297/228.12 X |
| 2,228,948 | 1/1941 | Field | 297/228.12 X |
| 2,313,878 | 3/1943 | Kline | 297/228.12 X |
| 2,797,743 | 7/1957 | Rodtz, Jr. | 297/229 |
| 2,817,391 | 12/1957 | Zacks | 297/229 |
| 2,822,862 | 2/1958 | Zacks | 297/229 |
| 3,226,157 | 12/1965 | Reinfeldt et al. | |
| 3,278,226 | 10/1966 | Magnusson | 297/228.12 X |
| 3,722,950 | 3/1973 | Harnick | 297/218.1 |
| 4,394,783 | 7/1983 | Simmons | 297/230.1 |
| 4,396,227 | 8/1983 | Neilson | 297/228.12 X |
| 4,669,779 | 6/1987 | Kaganas et al. | 297/229 |
| 4,676,549 | 6/1987 | English | 297/229 X |
| 4,693,511 | 9/1987 | Seltzer et al. | 297/228.11 X |
| 4,694,511 | 9/1987 | Estes et al. | 297/229 X |
| 4,718,721 | 1/1988 | Pompa | 297/288.11 |
| 4,824,168 | 4/1989 | Makoski | 297/229 |
| 4,958,886 | 9/1990 | Baraltini et al. | 297/229 |
| 4,969,683 | 11/1990 | Wallace et al. | 297/219.1 X |
| 5,005,901 | 4/1991 | Hinde | 297/229 |
| 5,150,947 | 9/1992 | Croshaw | 297/229 |
| 5,234,252 | 8/1993 | Wallach | 297/228.1 X |
| 5,494,330 | 2/1996 | Fotsch | 297/229 |
| 5,547,249 | 8/1996 | Riley et al. | 297/229 X |

OTHER PUBLICATIONS

Listing of seven car seat covers known to the Applicant, created Oct. 30, 1997, with brief descriptions of each device.
B&G Industries—"Semi–Custom Covers" and "Custom Covers." Made of denim. Attach to the seat with elastic cords around the back of the seat. For use on bench seats, such as those seen in vans and sport utility vehicles.
Caddis Manufacturing—"Pet Cushion Seat Cover." Made of cotton blend. Attaches to the seat with elastic cords and ties. For use on bench seats, such as those seen in vans and sport utility vehicles.
Kramer Products—"Seat Savers." Made of nylon. For use in cars, vans, and sport utility vehicles.
MEBLO Inc.—"Dog Travelbed." Made of durable fabric. Attaches to the headrests or seatbelt connections. For use in all cars, vans, and SUVs.

(List continued on next page.)

*Primary Examiner*—Jose V. Chen
*Assistant Examiner*—Rodney B. White
*Attorney, Agent, or Firm*—Jennifer H. Hammond; Arjuna S. Sanga

[57] ABSTRACT

A seat cover preferably made of washable fabric has flexible foam attachment members and a flexible foam flap and is removably installed on a vehicle's seat. The basic structure of the seat cover consists of a seat portion and a back portion with a flap portion longitudinally extending between the seat and back portions. The flap portion has one or more deformable pad members affixed to the flap portion for insertion of the flap portion into the seat between the back and the seat cushion of the seat. Two or more strap members extend transversely from the opposite corners of the seat cover and have at least one deformable pad affixed to the end of the strap member for insertion of the end of the strap member between the seat and the car body.

28 Claims, 2 Drawing Sheets

OTHER PUBLICATIONS

Orvis Company—"Car Nest for Sport Utility Vehicles." Made of cotton/poly blend. Attaches to bench seats with elastic straps. "Car Nest for Regular Cars." Made of cotton/poly blend. Attaches in the back seat with a spring–loaded bar across the top of the back seat. "Back Seat Saver Travelbed." Attaches around front seat headrests and selt belt loops with elastic straps. For use in all cars, vans and SUVs.

Cali Stazi and Company—"Cali Cover." Made of cotton/poly blend duct. Attaches to the seat with fabric flaps filled with beads along the side. For use in regular cars.

FOCA Enterprises—"Seatbrella." Works like a pillowcase with elastic at the bottom. For use on bucket seats and bench seats.

SEAT COVER

BACKGROUND OF THE INVENTION

This invention relates to an improved seat cover that is easily removable and, more particularly, to a vehicular seat cover with flexible foam attachment members that provide a cover that is easily affixed over a seat, easily removable from a seat, and which is comfortable for the user.

Currently, there exists seat covers with various mechanisms like straps with hooks, tails, tubes, and rods as means for attaching a cover to a seat. Each of these mechanisms render the seat cover difficult to apply, remove and manipulate. For example, covers employing elastic straps with hooks are difficult to affix to the seat's understructure, especially if there are few, if any, springs or brackets of the understructure in which to fixedly engage the hooks. Moreover, hooks are difficult to remove easily and quickly. Also, covers employing tubes are difficult to insert and difficult to remove as the tubes are not deformable.

The present invention provides flexible foam attachment members and a flexible foam tail, which are easily inserted between the back and seat cushions of the seat or between the seat and the car body, because of the flexibility of the foam. Additionally, the seat cover is easily removed merely by grabbing a portion and pulling it off. The flexible foam deforms and releases the seat cover easily while avoiding tearing the fabric of the seat cover. There has been a need in the art for a seat cover with flexible foam attachment members and flexible foam tails which allow for ease of insertion and removal of the seat cover, while also providing a seat cover which stays in place while in use. The preferred embodiment of this invention is made of a denim fabric which is inexpensive to produce, one hundred percent washable and easily personalized with monograms, art or decals before or after purchase. Those skilled in the art, however, will recognize that just about any material including leather, canvas, cotton duct, nylon or Gortex® brand expanded polytetrafluoroethylene (ePTFE) and laminates thereof may be employed to make this seat cover. This invention may be used in any kind of vehicle including sedans, vans, minivans and sports utility vehicles. It can be appreciated that in an age where people are interested in maintaining their vehicles longer by reducing wear and tear on the interior, this seat cover has many uses. It can be used for the transportation of animals, small children who are prone to make a mess and more mature children who participate in athletic activities that would bring dirt and dust into a vehicle. It could also be used by people whose professions lend themselves to bringing dirt and filth into a vehicle like gardeners or construction workers.

SUMMARY OF THE INVENTION

One form of the invention provides a seat cover which is easily applied and removed and which is well adapted for use with animals, small children, and other elements for protection against wear and tear. The basic structure of the inventive seat cover consists of a seat portion and a back portion with a flap portion longitudinally extending between the seat and back portions. The flap portion has one or more deformable pad members affixed to the flap portion for insertion of the flap portion into the seat between the back and the seat cushion of the seat. Two or more strap members extend transversely from the opposite corners of the seat cover and have at least one deformable foam pad affixed to the end of the strap member for insertion of the end of the strap member between the seat and the car body.

It is therefore a principal objective of the present invention to provide a seat cover which is easily applied and removed.

It is another objective of the present invention to provide a seat cover which its position during use.

It is still another objective of the present invention to provide a seat cover that may be used with any type of vehicle including sedans, vans, minivans, and sport utility vehicles.

It is yet another objective of the present invention to provide a seat cover that may be constructed with different widths to accommodate different sized seats in different sized cars.

It is a further objective of the present invention to provide a seat cover that is inexpensive to produce.

It is a still further objective of the present invention to provide a seat cover that is easily and 100% washable.

It is yet another objective of the present invention to provide a seat cover that is easily personalized with monograms, art, or decals before or after purchase.

It is still another objective of the present invention to provide a seat cover which may be made with any material including denim, leather, nylon, canvas, cotton duct, or Gortex® brand expanded polytetrafluoroethylene and laminates thereof.

These and other objects and advantages will be apparent from the following description of the preferred embodiments and the attached drawings.

DESCRIPTION OF THE PREFERRED EMBODIMENTS

Figure 1:
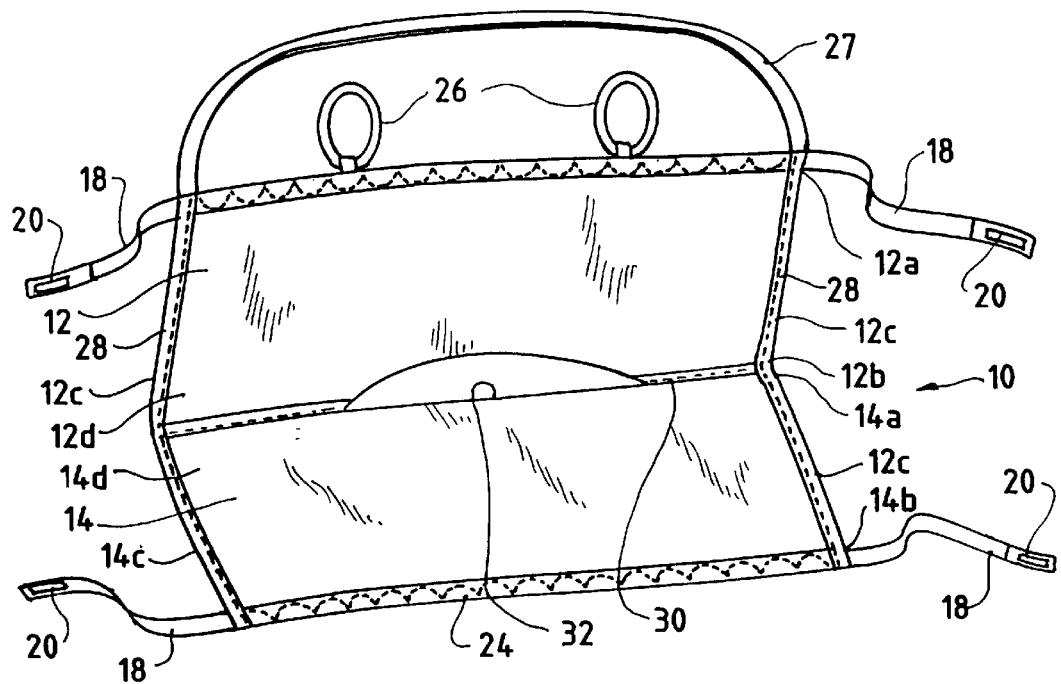
FIG. 1 is a front perspective view of the seat cover of the present invention.
Figure 2:
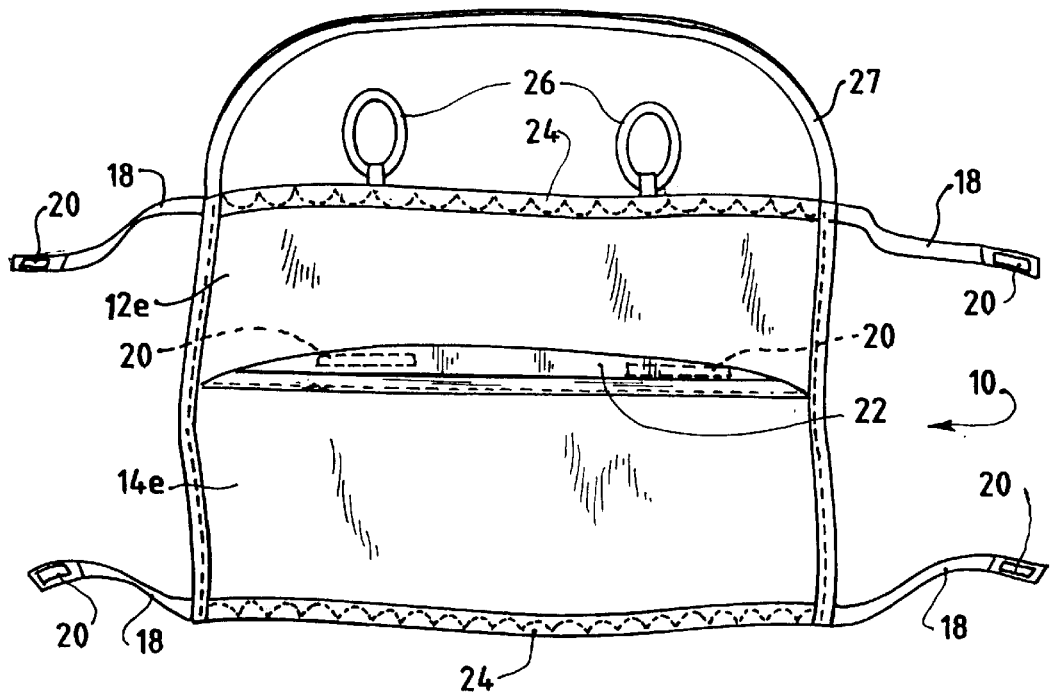
FIG. 2 is a rear perspective view of the seat cover of the present invention.
Figure 3:
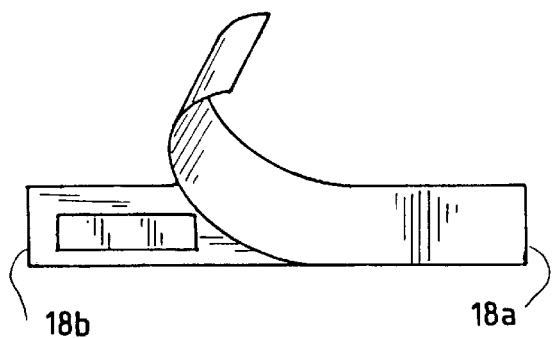
FIG. 3 is a side perspective view of the strap of the present invention with the upper layer of material peeled upwards for purposes of illustration.

The seat cover 10 of the present invention is illustrated in its fully assembled condition in FIGS. 1 and 2 depicted without the seat. The seat cover 10 consists generally of a back portion 12 and a seat portion 14 with a flap portion 22 extending between seat and back portions 12, 14. Flap portion 22 is affixed to the second surfaces 12e, 14e of seat and back portions 12, 14. Top end 12a of back portion 12 and bottom end 14b of seat portion 14 each have a longitudinally placed gathered seam 24. Flap portion 22 has one or more deformable pad members 20 placed therein. Four strap members 18 are transversely connected to gathered seam 24 and extend therefrom. Strap members 18 have pad members 20 affixed to the second end 18b of each strap member 18.

The preferred embodiment of seat cover 10 (FIGS. 1 and 2) comprises of two pieces of denim fabric, back portion 12 and seat portion 14, sewn together at seam 30 with flap portion 22 extending from seat portion 14. Cover 10 can also be made using the other fabrics stated above or like materials. Those skilled in the art will recognize that seat cover 10 may consist of one piece of cloth having a back portion 12 and a seat portion 14 with the flap portion 22 extending therefrom. If one piece of fabric is used, flap portion 22 may be constructed by gathering approximately twelve (12) inches of top end 14a of seat portion 14 and sewing the material to seam 30.

Alternatively, flap portion 22 may be a separate piece of cloth directly affixed between the back and seat portions 12, 14 by conventional means such as Velcro® flexible hook and loop connectors, stitching or the like. Thus, back 12, seat 14 and flap 22 portions may be made of one, two or three separate pieces of fabric. Cover 10 can alternatively be made of leather, canvas, cotton duct, nylon or ePTFE or laminates thereof.

Back portion 12 is approximately one and one-half (1½) feet tall and approximately four (4) feet wide and seat portion 14 is approximately two (2) feet tall and approximately four (4) feet wide in the preferred embodiment. Those skilled in the art will recognize that back portion 12 and seat portion 14 may be any appropriate height and width to cover a particular vehicle seat. Back portion 12 has a top end 12a and a bottom end 12b. Similarly, seat portion 14 has a top end 14a and a bottom end 14b. Bottom end 12b of back portion 12 and top end 14a of seat portion 14 are sewn together to form seam 30 with flap portion 22 extending therefrom. Top end 12a of back portion 12 and bottom end 14b of seat portion 14 each have approximately one and one-half (1½) inch gathered seams 24. Gathered seams 24 may be made of elastic band or other stretchable material. It is noteworthy, that gathered seams 24 reduce the width of the seat portion 14 and back portion 12 when gathered seams 24 are not stretched. Thus, the width of the top end 12a of back portion 12 with gathered seam 24 is approximately two (2) feet three (3) inches in the preferred embodiment, while the width of the bottom end 14b of the seat portion 14 with gathered seam 24 is approximately three (3) feet in the preferred embodiment. The gathered seams 24 can be stretched to the full width of the back portion 12 or the seat portion 14 of approximately four (4) feet. Sides 12c, 14c of back portion 12 and seat portion 14 respectively, have approximately one-half (½) inch seams 28 sewn in to prevent fraying or tearing of the seat cover 10.

Back portion 12 may have headrest attachment members 26 sewn into top end 12a spaced at a predetermined distance corresponding to a vehicle's headrests. It is important to point out that headrest attachment members 26, while not necessary to the operation of seat cover 10, may be provided for use in vehicles which have headrests. Headrest attachment members 26 may be made of any flexible or elastic material and may be made such that they are only slightly smaller than the width of the headrest. Thus, headrest attachment members 26 can be stretched to loop around the headrests and once in place will contract to hold against the headrests and keep seat cover 10 more firmly in place while in use.

Similarly, back portion 12 may also have an elastic loop member 27 having two ends, each end affixed to the top end 12a of the back portion 12. Elastic loop member 27, while not necessary to the operation of the seat cover 10, may be provided for a vehicle with a "bench-style" back seat. Elastic loop member 27 may be stretched around the back seat of a vehicle with a "bench-style" back seat to keep seat cover 10 in that style vehicle in place. Elastic loop member 27 may be made of any flexible or elastic material.

Strap members 18 are made of the same denim or other material as cover 10 and are sewn into gathered seam 24 and extend transversely from gathered seams 24. Strap members 18 can be alternately made of elastic. In the preferred embodiment, two strap members 18 extend one from each side of top end 12a of back portion 12. Further, two strap members 18 extend one from each end of bottom end 14b of seat portion 14. While four strap members 18 are preferred, two strap members 18 are sufficient. In the preferred embodiment, strap members 18 which attach to back portion 12 are approximately one-half (½) foot in length, and are shorter than strap members 18 which are attached to seat portion 14 which are approximately one and one-half (1½) feet in length. Strap members 18, in the preferred embodiment, consist of cloth that is approximately eight (8) inches wide that is folded with the open ends sewn together to form a seam 18a. Prior to closing and sewing this strap member 18 together, a deformable foam pad member 20, approximately three (3) inches long by four (4) inches wide by one (1) inch tall is placed in the second end 18b of the strap member 18 and sewn in using conventional methods. It is contemplated that two or more strap members may be used and such strap members 18 may be of various widths and sizes. It is preferred, however not necessary, that deformable pad members 20 be made of closed cell or open cell polyethylene foam or like materials as any deformable material would be suitable.

Flap member or portion 22 is approximately four (4) feet in length, matching the width of back portion 12 and seat portion 14, and is approximately twelve (12) inches tall. Three and one-half (3½) inches of the approximately twelve (12) inch section of flap portion 22 is folded over to enclose two deformable pad members 20 on either end. These pad members 20 are preferably eight (8) inches long by two (2) inches wide by one (1) inch tall and may be made of either open cell or closed cell polyethylene foam or like materials. Those skilled in the art will appreciate that flap portion 22 may comprise several separate segments of material containing pad members 20 to accomplish the intended function of flap portion 22.

Finally, seat belt slot 32 may be created by making a hole in the middle of the bottom end 12b of the back portion 12 approximately eight (8) inches wide. The slot 32 would allow users to use their seat belt while seat cover 10 was affixed to the seat. It is readily apparent to those skilled with the art that one or more seat belt slots 32 may be created for different types of vehicles.

Figure 4:
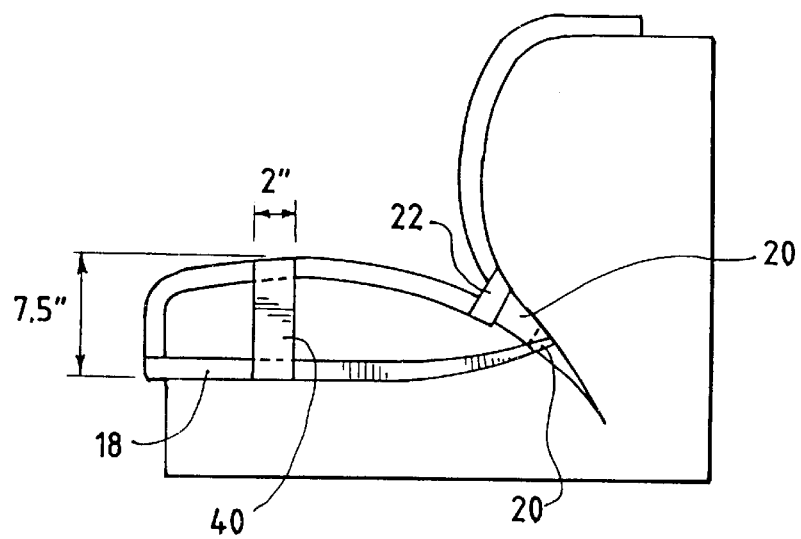
FIG. 4 is a cross sectional view of the seat cover of the present invention in use on and affixed to a seat.

As illustrated in FIG. 4, flap portion 22 is inserted between the back and the seat cushions of the seat keeping the seat cover 10 in place. More specifically, pad members 20 on the end of flap portion 22 are pushed between the back and the seat cushions. Each pad member 20 deforms to allow insertion between the back and the seat cushions and expands upon insertion, holding the seat cover 10 in place. Strap members 18 are similarly inserted between the seat and the frame of the car. Generally, the distance between seat portion 14 and strap 18 in its inserted position is about 7.5 inches. Once affixed, seat cover 10 is easily removed by grabbing seat cover 10 and pulling it off. Pad members 20 will deform upon receiving the pulling force and will detach from their relative positions between the seat and the back and the seat and the body frame.

Figure 5:
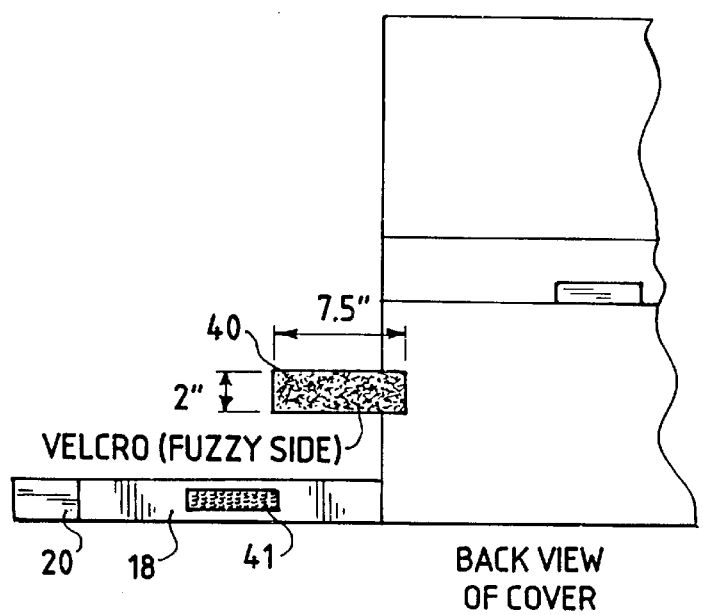
FIG. 5 is a rear elevational view of the seat cover illustrating an alternate embodiment utilizing Velcro® hook and loop fasteners.

As shown in FIGS. 4 and 5, Velcro® hook and loop fasteners 40, 41 can be employed to detachably fasten seat portion 14 to strap portion 18 for added stability. Also, a thin elastic strap (not illustrated) could be sewn at each end between seat portion 14 and strap portion 18, at generally a midpoint of the seat and strap portions, to facilitate a tight fit of the cover to the car seat.

Although the foregoing detailed description of the present invention has been described by reference to one embodiment, and the best mode contemplated for carrying out the present invention has been herein showed and described, it will be understood that modifications or variations in the structure and arrangements of this embodiment other than those specifically set forth herein may be achieved by those skilled in the art and that such modifications are to be considered as well as being within the overall scope of the present invention.

I claim:

1. A seat cover, comprising:
   a seat portion;
   a back portion;
   a flap position longitudinally extending between said seat and back portions, said flap portion having at least one deformable pad attached thereto; and
   at least one strap member having a first end and a second end, the first end of the at least one strap member extending from the back portion of said seat cover, the second end of said at least one strap member having at least one deformable pad member affixed thereto.

2. A seat cover as recited in claim 1 wherein said seat and back portions have a top end and a bottom end, the bottom end of said seat portion and the top end of said back portion each having a gathered seam affixed thereto.

3. A seat cover as recited in claim 2 further comprising:
   at least one headrest attachment member, said at least one headrest attachment member attached to the top end of said back portion.

4. A seat cover as recited in claim 3 wherein said headrest attachment members are made of an elastic band.

5. A seat cover as recited in claim 2 further comprising:
   a loop member, said loop member attached at both ends of said loop member to the top end of said back portion.

6. A seat cover as recited in claim 5 wherein said loop member is made of an elastic band.

7. A seat cover as recited in claim 2 wherein said back portion further comprises a slot positioned in the middle of the bottom end of said back portion for using seat belts.

8. A seat cover as recited in claim 2 wherein said seat portion further comprises a slot positioned in the middle of the top end of said seat portion for using seat belts.

9. A seat cover as recited in claim 2 wherein the gathered seams contain elastic.

10. A seat cover as recited in claim 2 wherein the gathered seam affixed to said back portion is shorter in length than the gathered seam affixed to said seat portion.

11. A seat cover as recited in claim 1 wherein said seat cover has four strap members each strap member extending from a different corner of said seat cover.

12. A seat cover as recited in claim 11 wherein two of the four strap members are shorter than the other strap members.

13. A seat cover as recited in claim 1 wherein said seat cover is made of a material selected from the group consisting of denim, canvas, cotton duct, leather, nylon and expanded polytetrafluoroethylene and laminates thereof.

14. A seat cover as recited in claim 1 wherein said deformable pads are made of a material selected from the group consisting of closed cell polyethylene foam and open cell polyethylene foam.

15. A seat cover as recited in claim 1 wherein said seat cover has at least two strap members, each strap member extending from said back portion.

16. A seat cover as recited in claim 15 wherein said at least two strap members extend from opposite corners of said back portion.

17. A seat cover as recited in claim 1 wherein said seat cover has at least four strap members, two of said at least four strap members extending from said back portion, and two of the at least four strap members extending from said seat portion.

18. A seat cover, comprising:
    a seat portion having first and second surfaces and top and bottom ends;
    a back position having first and second surfaces and top and bottom ends, the bottom end of said seat portion and the top end of said back portion each having a gathered seam; and
    at least one flap member longitudinally connected between said seat and back portions, said flap member having at least one deformable foam pad attached thereto, said flap member connected to the second surfaces of said seat and back portions.

19. A seat cover as recited in claim 18 further comprising:
    at least one headrest attachment member, said at least one headrest attachment member attached to the top end of said back portion.

20. A seat cover as recited in claim 19 wherein said headrest attachment members are made of an elastic band.

21. A seat cover as recited in claim 18 wherein said seat cover is made of a material selected from the group consisting of denim, leather, canvas, cotton duct, nylon and expanded polytetrafluoroethylene and laminates thereof.

22. A seat cover as recited in claim 18 wherein said deformable pads are made of a material selected from the group consisting of closed cell polyethylene foam and open cell polyethylene foam.

23. A seat cover as recited in claim 18 wherein said back portion further comprises a slot positioned in the middle of the bottom end of said back portion for using seat belts.

24. A seat cover as recited in claim 18 further comprising:
    at least one strap member having a first end and a second end, the first end of the at least one strap member extending from the back portion of said seat cover, the second end of said at least one strap member having at least one deformable pad member affixed thereto.

25. A seat cover as recited in claim 24 wherein said seat cover has at least two strap members each strap member extending transversely from a corner of said seat cover.

26. A seat cover as recited in claim 24 wherein said seat cover has at least two strap members each strap member extending from said back portion.

27. A seat cover as recited in claim 24 wherein said seat cover as at least four strap members, two of said at least four strap members extending from said back portion, and two of said at least four strap members extending from said seat portion.

28. A seat cover, comprising:
    a seat portion having first and second surfaces and top and bottom ends, said seat portion having a slot positioned in the middle of the top end of said seat portion for using seat belts;
    a back portion having first and second surfaces and top and bottom ends, the bottom end of said seat portion and the top end of said back portion each having a gathered seam affixed thereto, wherein the gathered seam of said back portion is shorter in length than the gathered seam of said seat portion, wherein said seat cover is made of a material selected from the group consisting of denim, canvas, cotton duct, leather, nylon, and expanded polytetrafluoroethylene and laminates thereof;

a plurality of deformable pad members made of a material selected from the group consisting of closed cell polyethylene foam and open cell polyethylene foam;

at least one flap member longitudinally connected between said seat and back portions, said flap member having at least one deformable foam pad attach thereto, said flap member connected to the second surfaces of said seat and back portions; and four strap members each having first and second ends, each strap member extending from a different corner of said seat cover, each of said strap members having at least one deformable pad member affixed to the second end of said strap member, wherein two strap members are shorter than the other two strap members.

* * * * *